US011016296B2

(12) United States Patent
Sumigama

(10) Patent No.: US 11,016,296 B2
(45) Date of Patent: May 25, 2021

(54) TERMINAL DEVICE

(71) Applicant: SUNCORPORATION, Konan (JP)

(72) Inventor: Tatsumi Sumigama, Konan (JP)

(73) Assignee: Suncorporation, Konan (JP)

( * ) Notice: Subject to any disclaimer, the term of this patent is extended or adjusted under 35 U.S.C. 154(b) by 195 days.

(21) Appl. No.: 16/305,682

(22) PCT Filed: May 17, 2017

(86) PCT No.: PCT/JP2017/018455
§ 371 (c)(1),
(2) Date: Nov. 29, 2018

(87) PCT Pub. No.: WO2017/208814
PCT Pub. Date: Dec. 7, 2017

(65) Prior Publication Data
US 2020/0326540 A1    Oct. 15, 2020

(30) Foreign Application Priority Data
May 30, 2016   (JP) .............................. JP2016-107450

(51) Int. Cl.
*G02B 27/01*   (2006.01)
*G06F 16/587*  (2019.01)
(Continued)

(52) U.S. Cl.
CPC ....... *G02B 27/017* (2013.01); *G02B 27/0101* (2013.01); *G06F 1/163* (2013.01);
(Continued)

(58) Field of Classification Search
CPC ........ G06F 16/587; G06F 1/163; G06F 3/011; G06F 3/012; G06F 3/013; G06F 3/014;
(Continued)

(56) References Cited

U.S. PATENT DOCUMENTS

2010/0189365 A1*  7/2010  Kanekiyo ........... G06F 16/5838
                                                         382/209
2011/0280445 A1* 11/2011  Lieberknecht ........ G06F 16/532
                                                         382/103
(Continued)

FOREIGN PATENT DOCUMENTS

JP      H11144042     5/1999
JP      2002259973    9/2002
(Continued)

OTHER PUBLICATIONS

Written Opinion for Application No. PCT/JP2017/018455, dated Aug. 8, 2018 (5 pages).
(Continued)

*Primary Examiner* — Tom V Sheng
(74) *Attorney, Agent, or Firm* — K&L Gates LLP

(57) ABSTRACT

A controller of a terminal device comprises an image capture controlling unit, a creating unit, a storage controlling unit, and a display controlling unit. The image capture controlling unit causes the image capturing unit to perform image capture. The creating unit creates feature information indicating a feature of an environment of the terminal device at a target timing when the image capturing unit performs image capture of a target image. The storage controlling unit stores the captured target image and the created feature information in association with each other in a storage unit. The display controlling unit causes a display unit to display the target image stored in the storage unit in association with the feature information indicating the feature, in a specific case where the feature is detected after the target image and the feature information have been stored in the storage unit.

12 Claims, 9 Drawing Sheets

(51) Int. Cl.
  *G06F 1/16* (2006.01)
  *G06F 3/01* (2006.01)
  *G06K 9/00* (2006.01)
  *G06K 9/46* (2006.01)
  *G06T 5/00* (2006.01)
  *H04N 5/225* (2006.01)

(52) U.S. Cl.
  CPC ............ *G06F 3/011* (2013.01); *G06F 16/587* (2019.01); *G06K 9/00671* (2013.01); *G06K 9/46* (2013.01); *G06T 5/00* (2013.01); *H04N 5/225* (2013.01); *G02B 2027/014* (2013.01); *G02B 2027/0138* (2013.01); *G02B 2027/0141* (2013.01); *G02B 2027/0178* (2013.01)

(58) Field of Classification Search
  CPC .. G06F 3/0304; G06F 3/0306; G06F 3/04815; G02B 27/017; G02B 27/0101; G02B 27/0172; G02B 2027/0138; G02B 2027/014; G02B 2027/0141; G02B 2027/0178; G06K 9/00671; G06K 9/46; G06T 5/00; G06T 7/70; G06T 7/73; G06T 7/74; H04N 5/225
  USPC .......................................................... 345/8
  See application file for complete search history.

(56) References Cited

U.S. PATENT DOCUMENTS

| 2012/0243739 | A1* | 9/2012 | Fukuchi | G06F 16/583 382/103 |
| 2014/0063060 | A1* | 3/2014 | Maciocci | G06T 19/006 345/633 |
| 2014/0125558 | A1 | 5/2014 | Miyajima et al. | |
| 2015/0103193 | A1* | 4/2015 | Bokari | G01C 21/165 348/208.6 |
| 2015/0317834 | A1* | 11/2015 | Poulos | G06F 3/011 345/619 |
| 2016/0035137 | A1* | 2/2016 | Sendai | G06F 3/011 345/633 |
| 2016/0133051 | A1* | 5/2016 | Aonuma | G06T 11/00 345/633 |
| 2016/0349510 | A1* | 12/2016 | Miller | H04N 13/398 |
| 2017/0206691 | A1* | 7/2017 | Harrises | G02B 27/0172 |
| 2018/0077298 | A1* | 3/2018 | Matsunaga | H04N 5/77 |
| 2018/0197344 | A1* | 7/2018 | Takano | G06F 3/013 |

FOREIGN PATENT DOCUMENTS

| JP | 2005147674 | | 6/2005 |
| JP | 2010176346 | A | 8/2010 |
| JP | 2011138258 | | 7/2011 |
| JP | 2014093050 | | 5/2014 |
| JP | 2016107450 | A | 6/2016 |
| WO | 2011148034 | A1 | 12/2011 |

OTHER PUBLICATIONS

International Search Report for Application No. PCT/JP2017/018455, dated Jul. 27, 2017 (4 pages).
Written Opinion for Application No. PCT/JP2017/018455, dated Jul. 27, 2017 (4 pages).
Extended European Search Report for European Patent Application No. EP17806372.3 dated Jan. 7, 2020.
Japanese Office Action for JP2016-107450, dated Apr. 21, 2020 with English Translation.
Japanese Office Action for JP2016-107450, dated Jul. 28, 2020 with English Translation.

* cited by examiner (First Embodiment)

(First Embodiment)

(First Embodiment)

(First Embodiment)

(Second Embodiment)

(Second Embodiment)

(Second Embodiment)

(Second Embodiment)

(Third Embodiment)

(Third Embodiment)

(Fourth Embodiment)

(Fourth Embodiment)

TERMINAL DEVICE

CROSS-REFERENCE TO RELATED APPLICATION

This application is a U.S. National Stage Entry under 35 U.S.C. § 371 of International Patent Application No. PCT/JP2017/018455, filed May 17, 2017 which application claims priority under 35 U.S.C. 119(b) and 37 CFR 1.55 to Japanese Application No. 2016107450, filed May 30, 2016, the entire disclosures of which are hereby incorporated by reference herein.

TECHNICAL FIELD

The technique disclosed herein relates to a terminal device configured to cause a display unit to display an image.

BACKGROUND ART

Japanese Patent Application Publication No. 2014-93050 (hereinbelow termed Patent Literature 1) describes an image display device used by being worn on a head of a user. This type of image display device is provided with a display unit configured to display an image of a range corresponding to the user's view (that is, a reality image), and a computer configured to display an object image indicating an object related to an image to be displayed on the display unit by composing the object image on the reality image displayed on the display unit.

SUMMARY OF INVENTION

Technical Problem

Provision of a technique that enables a captured image to be suitably displayed when a predetermined condition is satisfied is being demanded.

The description herein discloses a technique that enables a captured image to be suitably displayed on a display unit when a predetermined condition is satisfied.

Solution to Technical Problem

A terminal device disclosed in the description herein may comprise an image capturing unit, a display unit, a controller, and a storage unit. The controller may comprise an image capture controlling unit, a creating unit, a storage controlling unit, and a display controlling unit. The image capture controlling unit may be configured to cause the image capturing unit to perform image capture. The creating unit may be configured to create feature information indicating a feature of an environment of the terminal device at a target timing when the image capturing unit performs image capture of a target image. The storage controlling unit may be configured to store the target image that was captured and the feature information that was created in the storage unit in association with each other. The display controlling unit may be configured to cause the display unit to display the target image stored in the storage unit in association with the feature information indicating the feature, in a specific case where the feature is detected after the target image and the feature information have been stored in the storage unit.

The above terminal device causes the display unit to display the target image stored in the storage unit in association with the feature information indicating the feature in the specific case where the feature is detected after the target image and the feature information have been stored in association with each other in the storage unit. Due to this, according to the above terminal device, the target image that was captured can suitably be displayed in the display unit in the specific case, which is a case where a predetermined condition is satisfied.

Another terminal device disclosed in the description herein may comprise a display unit, a controller, and a storage unit. The controller may comprise an acquiring unit, a storage controlling unit, and a display controlling unit. The acquiring unit may be configured to acquire a target image captured by an image capturing unit and feature information indicating a feature of an environment of the terminal device at a target timing when the image capturing unit performs image capture of the target image. The storage controlling unit may be configured to store the target image and the feature information that were acquired in the storage unit in association with each other. The display controlling unit may be configured to cause the display unit to display the target image stored in the storage unit in association with the feature information indicating the feature, in a specific case where the feature is detected after the target image and the feature information have been stored in the storage unit.

Similarly to the above, with this terminal device as well, the target image that was captured in advance by the image capturing unit can suitably be displayed in the display unit in the specific case, which is a case where a predetermined condition is satisfied.

A controlling method, a computer program, and a computer-readable recording medium storing the computer program for realizing the above terminal devices are also novel and useful.

DESCRIPTION OF EMBODIMENTS

Figure 1:
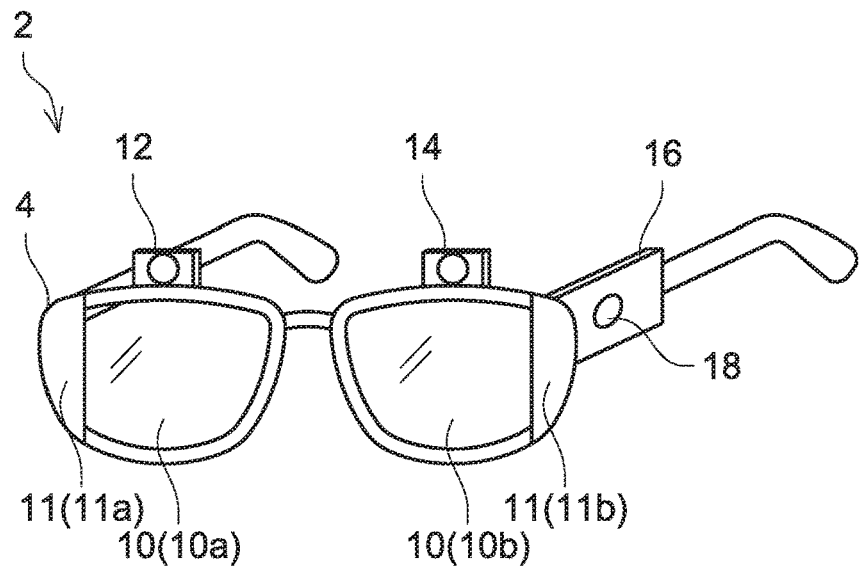
FIG. 1 shows an outer appearance of a terminal device.

Primary features of embodiments described below will be listed. The technical elements described herein are each independent technical elements, which exhibits technical usefulness solely or in various combinations, and are not limited to combinations recited in the claims as originally filed.

(Feature 1) The terminal device may further comprise a location detecting unit configured to detect a location of the terminal device in a predetermined area. The creating unit may be configured to create the feature information indicating the feature including a target location detected by the location detecting unit at the target timing. The display controlling unit may be configured to cause the display unit to display the target image stored in the storage unit in association with the feature information indicating the feature including the target location, in the specific case where the target location is detected by the location detecting unit after the target image and the feature information have been stored in the storage unit.

Here, the "location detecting unit" may include, for example, a GPS receiver. Other than the aforementioned, the "location detecting unit" may include various arbitrary devices, such as a controller and a communication interface, that are configured capable of detecting the location of the terminal device in the predetermined area. In a case of using the controller and the communication interface as the location detecting unit, for example, the controller may detect the location of the terminal device by detecting a Wi-Fi communication access point via the communication interface and calculating a locational relationship between the access point and the terminal device.

According to this configuration, the terminal device can cause the display unit to display the target image in the specific case where the target location is detected by the location detecting unit after the target image and the feature information have been stored in association with each other in the storage unit. A user of the terminal device can see the target image displayed on the display unit by arranging the terminal device at the target location, which is the location detected at the target timing when the target image was captured. Due to this, the user of the terminal device can see the target image by arranging the terminal device at the same location as the location where the target image was captured. Thus, the user of the terminal device can suitably compare a situation at the time when the target image was captured with a current situation.

(Feature 2) The terminal device may further comprise a sensor configured to detect a posture of the terminal device. The creating unit may be configured to create the feature information indicating the feature further including a target posture detected by the sensor at the target timing. The display controlling unit may be configured to cause the display unit to display the target image stored in the storage unit in association with the feature information indicating the feature including the target location and the target posture, in the specific case where the target location is detected by the location detecting unit and the target posture is detected by the sensor after the target image and the feature information have been stored in the storage unit.

According to this configuration, the terminal device can cause the display unit to display the target image in the specific case where the target location is detected by the location detecting unit and the target posture is detected by the sensor after the target image and the feature information have been stored in the storage unit in association with each other. The user of the terminal device can see the target image displayed on the display unit by arranging the terminal device at the target location, which is the location that was detected at the target timing when the target image was captured, and retaining the terminal device in the posture that was detected at the target timing. Due to this, the user of the terminal device can see the target image by arranging the terminal device at the same location as the location where the target image was captured and retaining it in the same posture. The user of the terminal device can more suitably compare the situation at the time when the target image was captured with the current situation.

(Feature 3) The creating unit may be configured to specify a feature element included in the target image captured by the image capturing unit at the target timing and create the feature information indicating the feature including the feature element that was specified. The display controlling unit may be configured to cause the display unit to display the target image stored in the storage unit in association with the feature information indicating the feature including the feature element, in the specific case where image capture of the feature element by the image capturing unit is detected after the target image and the feature information have been stored in the storage unit.

According to this configuration, the terminal device can cause the display unit to display the target image in the specific case where image capture of the feature element by the image capturing unit is detected after the target image and the feature information have been stored in the storage unit in association with each other. The user of the terminal device can see the target image displayed on the display unit by causing the image capturing unit to capture the feature element included in the target image again. Due to this, the user of the terminal device can more suitably compare the situation at the time when the target image was captured with the current situation.

(Feature 4) The terminal device may further comprise a frame being wearable on a head of a user. The image capturing unit may be mounted on the frame and capable of capturing a range corresponding to a range of view of the user. The display unit may be mounted on the frame and arranged at a position facing at least one of a right eye and a left eye of the user wearing the frame.

According to this configuration, the terminal device can capture the target image of the range corresponding to the range of view of the user and store it in the storage unit, and can cause the display unit to display the target image in the specific case. The user of the terminal device can compare the situation at the time when the target image was captured with the current situation, with user's own range of view as a reference.

Figure 2:
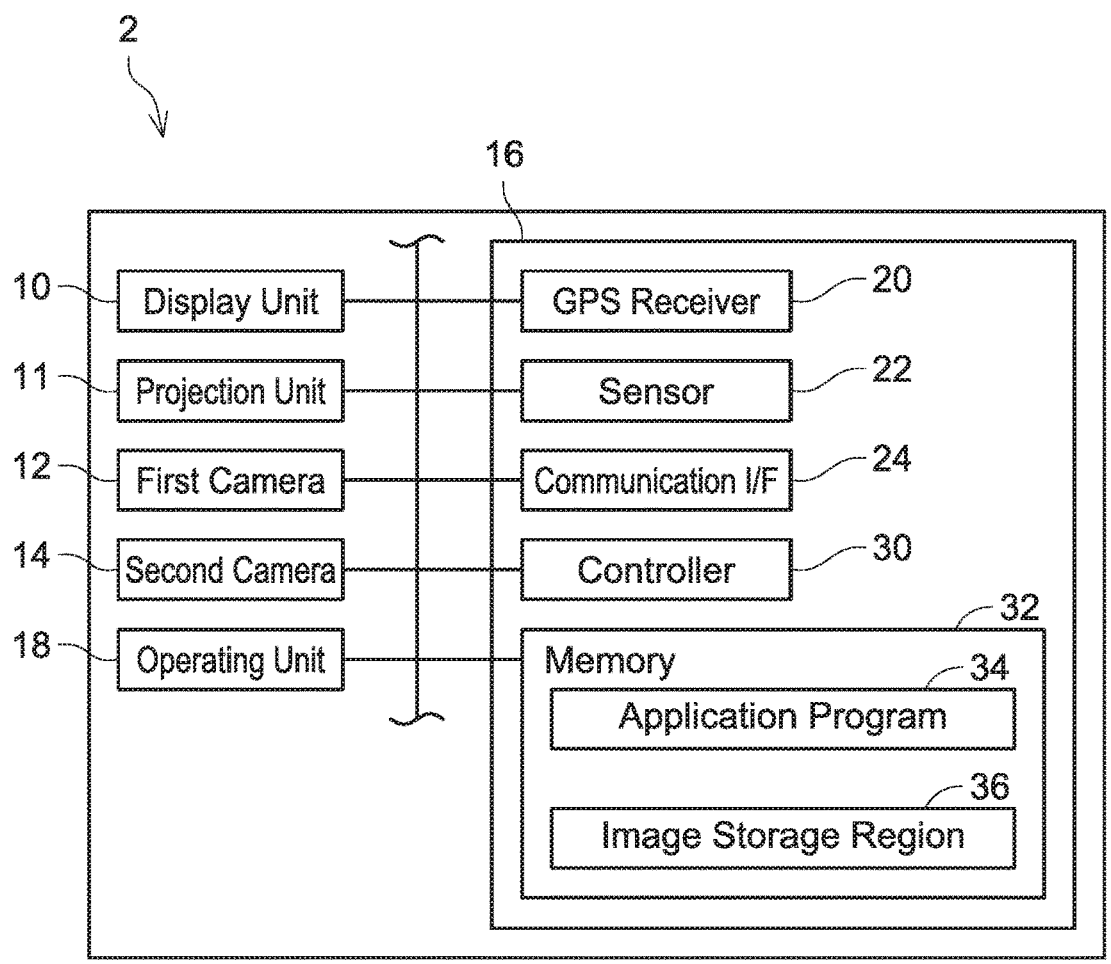
FIG. 2 shows a configuration of the terminal device.

First Embodiment (Configuration of Terminal Device 2; FIGS. 1 and 2)

A terminal device 2 shown in FIG. 1 is an image display device used by being worn on a head of a user (a so-called head-mount display). The terminal device 2 includes a frame 4, display units 10a, 10b, projection units 11a, 11b, a first camera 12, a second camera 14, a control box 16, and an operating unit 18.

The frame 4 is a member in a form of a glasses frame. The user can wear the terminal device 2 on the head by wearing the frame 4 similarly to wearing glasses.

The display units 10a, 10b are each light permeable display members. When the user wears the terminal device 2 on the head, the display unit 10a is arranged at a position facing a right eye of the user and the display unit 10b is arranged at a position facing a left eye of the user. Hereinbelow, the left and right display units 10a, 10b may collectively termed a display unit 10. In the present embodiment, the user can see its surroundings through the display unit 10.

The projection units 11a, 11b are members configured to project images on the display units 10a, 10b. The projection units 11a, 11b are provided on sides of the display units 10a, 10b, respectively. Hereinbelow, the left and right projection units 11a, 11b may collectively be termed a projection unit 11. In the present embodiment, the projection unit 11 is configured to project a predetermined target image on the display unit 10 according to instructions from a controller 30. Hereinbelow, in the present description, explanation on operations of the projection unit 11 may be omitted upon explaining about the controller 30 causing the display unit 10 to display a desired image by instructing projection of the image to the projection unit 11, and such may be expressed simply as "the controller 30 causes the display unit 10 to display the desired image" and the like.

The first camera 12 is a camera arranged at a position above the display unit 10a (that is, a position corresponding to the right eye of the user) of the frame 4. On the other hand, the second camera 14 is a camera arranged at a position above the display unit 10b (that is, a position corresponding to the left eye of the user) of the frame 4. A range corresponding to a range of view of the user who wears the terminal device 2 (hereinbelow termed a "specific range") can be captured from different angles respectively by the first camera 12 and the second camera 14. Hereinbelow, the first camera 12 and the second camera 14 may collectively be termed "cameras".

The control box 16 is a box attached to a part of the frame 4. The control box 16 accommodates respective elements that constitute a control system of the terminal device 2. Specifically, as shown in FIG. 2, the control box 16 accommodates a GPS (abbreviation of Global Positioning System) receiver 20, a sensor 22, a communication interface 24, the controller 30, and a memory 32. Hereinbelow, the interface may be denoted "I/F".

The operating unit 18 is provided on an outer surface of the control box 16. The operating unit 18 is a button which the user can operate, and the user can input various instructions including an image capturing instruction, which is to be described later, to the terminal device 2 by operating the operating unit 18.

The constituent elements in the control box 16 will be described with reference to FIG. 2. The GPS receiver 20 is a user segment of GPS, and is configured to receive radio waves from a GPS satellite, and calculate and output a location of itself on earth. The controller 30 is configured to specify a location of the terminal device 2 by using the location outputted from the GPS receiver 20.

The sensor 22 is a three-axis acceleration sensor. The sensor 22 is configured to detect acceleration in three axes, namely X, Y, and Z axes. The controller 30 is configured to specify a posture and a motion state of the terminal device 2 by using detection values of the sensor 22.

The communication IF 24 is an I/F for executing a wireless communication with an external device (such as another terminal device having a communication function).

The controller 30 is configured to execute various processes according to an application program 34 stored in the memory 32. Contents of the processes executed by the controller 30 will be described later in detail. Further, as shown in FIG. 2, the controller 30 is electrically connected to the display unit 10, the projection unit 11, the first camera 12, the second camera 14, the operating unit 18, the GPS receiver 20, the sensor 22, the communication I/F 24, and the memory 32, and is configured to control operations of these elements.

The memory 32 stores various programs including the application program 34. The application program 34 is a program for causing the controller 30 to execute various processes such as a record process (see FIG. 3) and a reproduction process (see FIG. 4) to be described later. Further, the memory 32 includes an image storage region 36 for storing combinations of target images and feature information to be created by execution of the record process to be described later.

Figure 3:
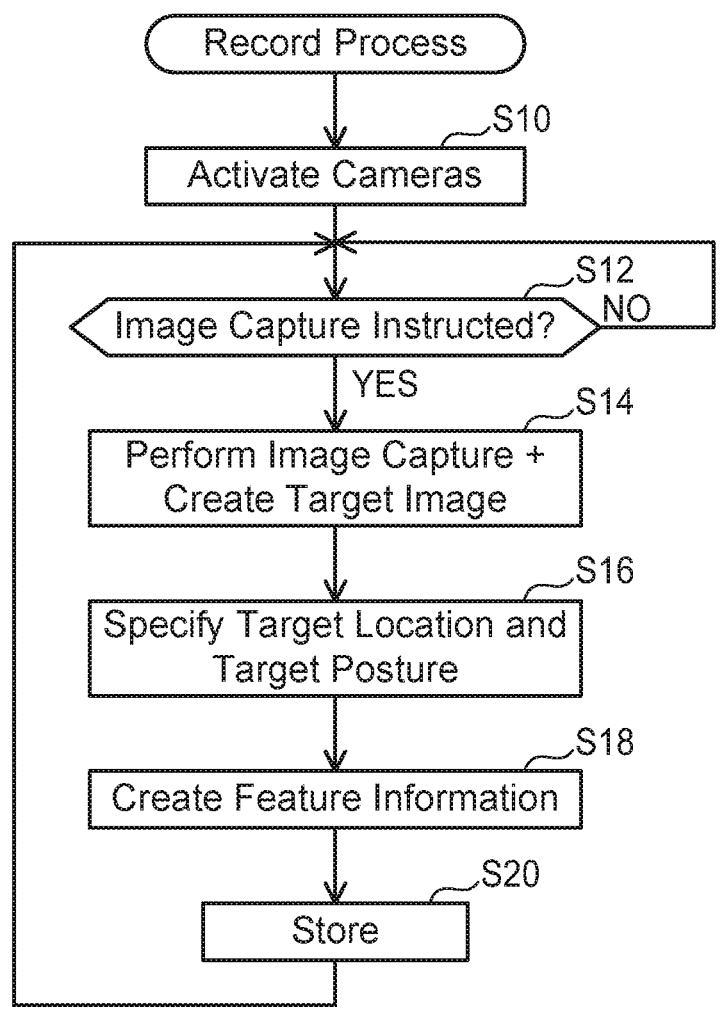
FIG. 3 shows a flowchart of a record process according to a first embodiment.

(Record Process; FIG. 3)

The record process executed by the controller 30 of the terminal device 2 of the present embodiment will be described with reference to FIG. 3. The controller 30 starts the record process of FIG. 3 when the user wears the terminal device 2 on the head, turns on a power of the terminal device 2, and then inputs a predetermined record process starting instruction to the operating unit 18.

In S10, the controller 30 activates the cameras (that is, the first camera 12 and the second camera 14). When the cameras are activated, the cameras start operating in an image capture mode for capturing the aforementioned specific range. Once the cameras start operating in the image capture mode, the cameras shifts to a state of capturing the specific range continuously, however, shutters are not opened unless an image capturing instruction (to be described later) is inputted, and images (still images) which the cameras are capturing are not stored in the memory 32.

In subsequent S12, the controller 30 monitors an input of the image capturing instruction. The user can operate the operating unit 18 to input the predetermined image capturing instruction at a timing when image capture is desired. When the image capturing instruction is inputted, the controller 30 determines YES in S12 and proceeds to S14.

In S14, the controller 30 causes the cameras to perform image capture and creates a target image. Specifically, the controller 30 captures an image by opening the shutter of the first camera 12 and captures an image by opening the shutter of the second camera 14. Then, the controller 30 creates the target image, which is a single image, by using the captured image by the first camera 12 and the captured image by the second camera 14.

In subsequent S16, the controller 30 specifies a target location that is the location of the terminal device 2 at this time point (that is, at a time point when the target image is created) and a target posture that is the posture of the terminal device 2 at this time point. Specifically, the controller 30 specifies the target location of the terminal device 2 based on the location which the GPS receiver 20 outputs at this time point, and specifies the target posture of the terminal device 2 based on the posture which the sensor 22 specifies at this time point.

In subsequent S18, the controller 30 creates feature information that includes information indicating the target location specified in S16 and information indicating the target posture. The feature information includes various types of information, in addition to the information indicating the target location and the information indicating the target posture, such as date and time of image capture of the target image and an image number for identifying the target image.

In subsequent S20, the controller 30 stores the target image created in S14 and the feature information created in S18 in association with each other in the image storage region 36 of the memory 32. Due to this, a combination of the target image and the feature information is stored in the image storage region 36.

When S20 is terminated, the controller 30 returns to S12 and monitors an input of anew image capturing instruction. Each time a new image capturing instruction is inputted, a new combination of target image and feature information is stored in the image storage region 36 (S14 to S20). When a predetermined process terminating instruction is inputted to the operating unit 18 while the record process of FIG. 3 is being executed, the controller 30 stops the cameras and terminates the record process of FIG. 3.

Figure 4:
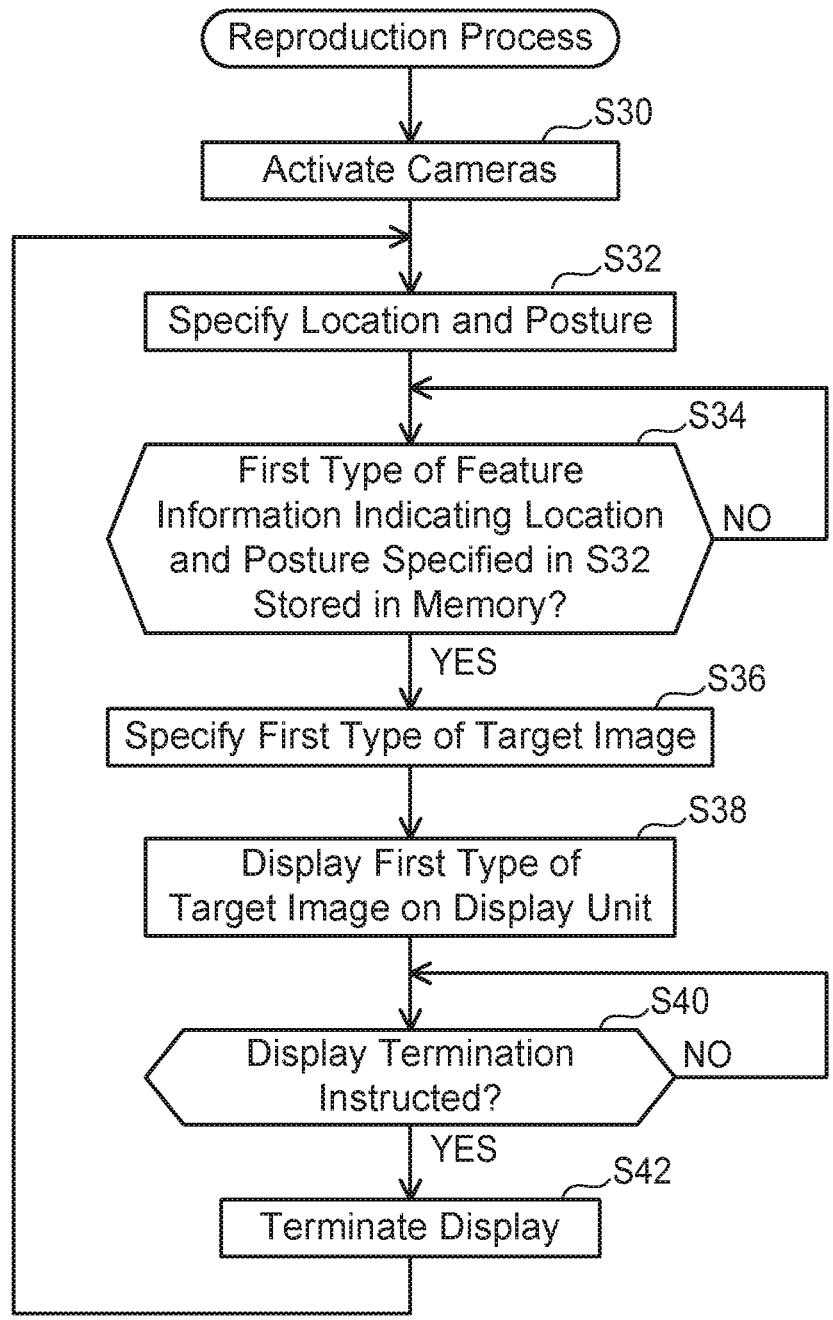
FIG. 4 shows a flowchart of a reproduction process according to the first embodiment.

(Reproduction Process; FIG. 4)

The reproduction process which the controller 30 of the terminal device 2 executes will be described with reference to FIG. 4. The controller 30 starts the reproduction process of FIG. 4 when the user wears the terminal device 2 on the head, turns on the power of the terminal device 2, and then inputs a predetermined reproduction process starting instruction to the operating unit 18.

In S30, the controller 30 activates the cameras. As aforementioned, once activated, the cameras start operating in the image capture mode. In subsequent S32, the controller 30 specifies the location and the posture of the terminal device 2 at this time point based on the location outputted by the GPS receiver 20 and the posture specified by the sensor 22.

In subsequent S34, the controller 30 determines whether or not feature information that includes information indicating the target location and information indicating the target posture that match the location and the posture specified in S32 (hereinbelow, this feature information may be termed "first type of feature information" in this embodiment) is stored in the image storage region 36 of the memory 32. In a case where the first type of feature information exists in the image storage region 36, the controller 30 determines YES in S34 and proceeds to S36. On the other hand, in a case where the first type of feature information does not exist in the image storage region 36, the controller 30 determines NO in S34 and returns to S32.

In S36, the controller 30 specifies the target image associated with the first type of feature information (hereinbelow "first type of target image") in the image storage region 36.

In subsequent S38, the controller 30 causes the display unit 10 to display the first type of target image specified in S36. Display examples of causing the display unit 10 to display the first type of target image in S38 will be described later in detail with reference to FIGS. 5 and 6. During when the first type of target image is displayed on the display unit 10, the user can operate the operating unit 18 to input a predetermined display switching instruction. When the display switching instruction is inputted, the controller 30 changes a display of the first type of target image according to the inputted display switching instruction.

In subsequent S40, the controller 30 monitors an input of a predetermined display terminating instruction. During when the first type of target image is displayed on the display unit 10, the user can operate the operating unit 18 to input the predetermined display terminating instruction. When the display terminating instruction is inputted, the controller 30 determines YES in S40, and terminates the display of the first type of target image in S42. After this, the controller 30 returns to S32, and executes the determination of S34 again based on the location and posture of the terminal device 2 acquired in S32. When a predetermined process terminating instruction is inputted to the operating unit 18 while the reproduction process of FIG. 4 is being executed, the controller 30 stops the cameras and terminates the reproduction process of FIG. 4.

Figure 5:
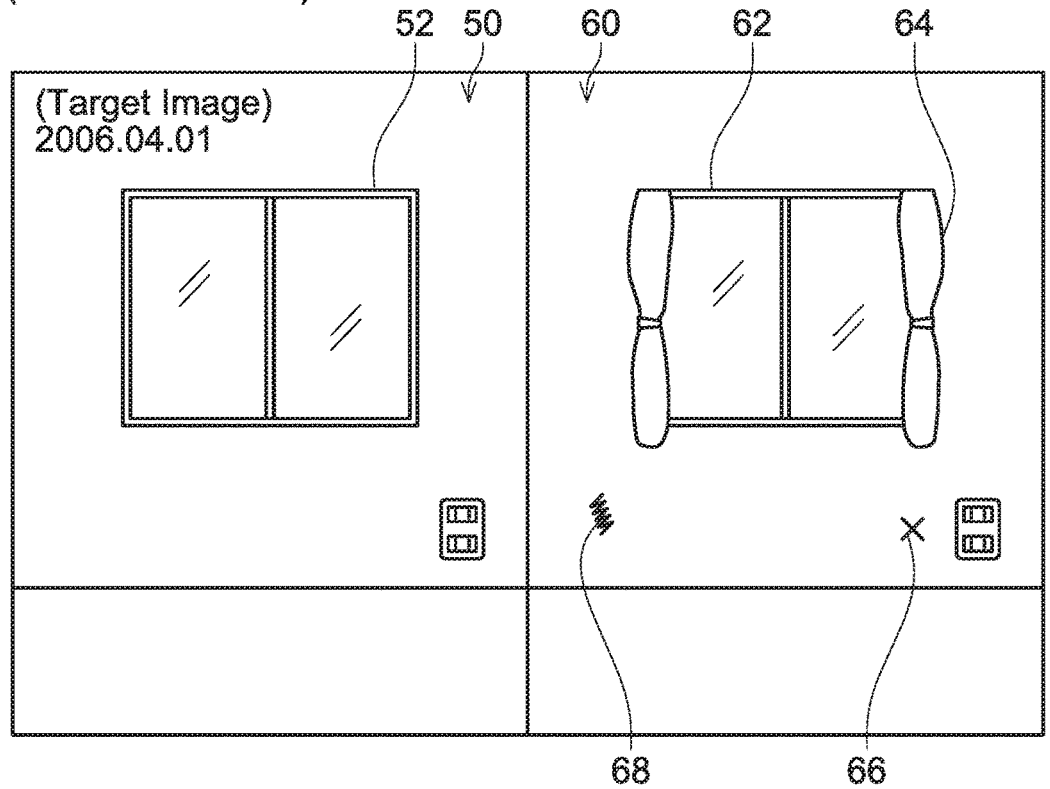
FIG. 5 shows a display example displaying a target image adjacent to a current state in the first embodiment.
Figure 6:
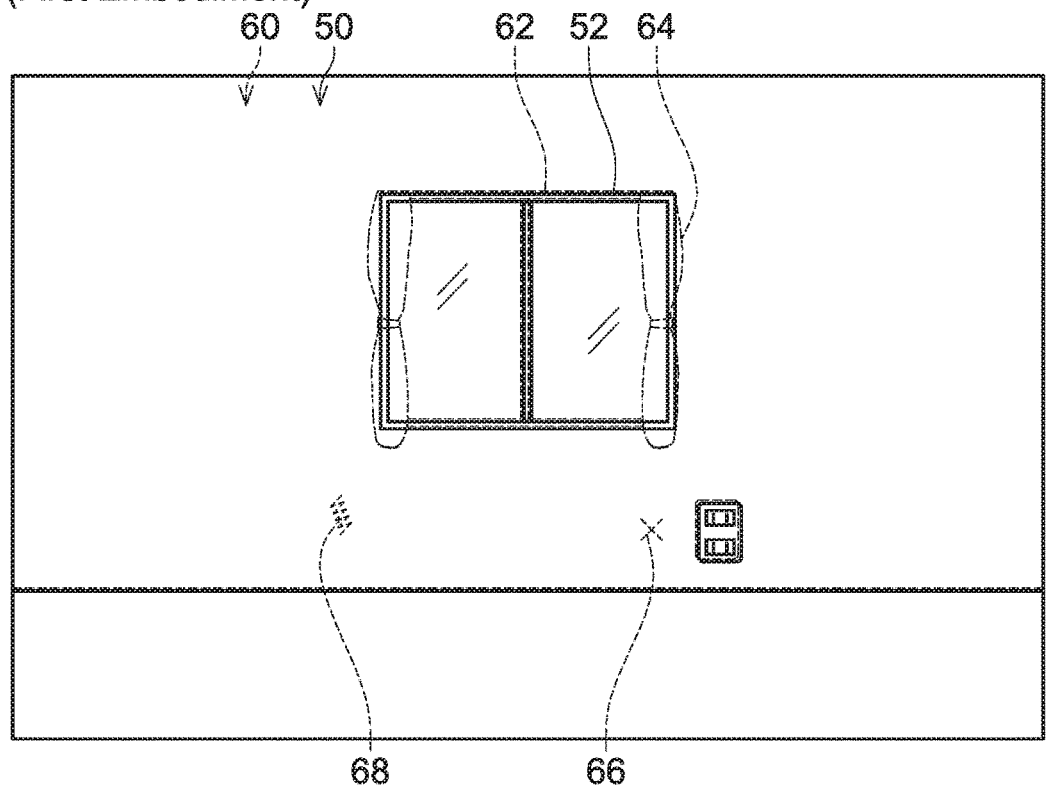
FIG. 6 shows a display example displaying the target image overlapped on the current state in the first embodiment.

(Display Examples of First Type of Target Image; FIGS. 5 and 6)

The display examples for how the first type of target image is displayed on the display unit 10 in the present embodiment (see S38 of FIG. 4) will be described with reference to FIGS. 5 and 6. In the examples of FIGS. 5 and 6, a situation is assumed in which the user wishes to compare a first type of target image 50 that had captured a state of a room in an apartment when a tenant moves in with a state 60 (which hereinbelow may be termed a "current state") of the room in the apartment at present (for example, when the tenant moves out from the apartment). More specifically, a situation is assumed in which the user wishes to confirm a degree of damages and contamination caused during an inhabiting period by comparing the state of the room upon the move-in with the current state of the room. FIGS. 5 and 6 both show the display examples of the first type of target image 50 under the situation as above. When the display switching instruction is inputted, the controller 30 can switch between the display of FIG. 5 and the display of FIG. 6 to be displayed on the display unit 10.

In the example of FIG. 5, the first type of target image 50 is displayed on a left side in the display unit 10 (that is, in the left side of the user's range of view). According to the display of FIG. 5, the user can see and compare the first type of target image 50 displayed on the left side in the display unit 10 with the current state 60 which the user can directly see through a right side in the display unit 10 (that is, the right side of the user's range of view). The first type of target image 50 includes an image of a window frame 52. Further, the first type of target image 50 also has an indication of being the target image and the date and time when the target image was captured ("2006.04.01") displayed therewith. On the other hand, in the current state 60, a window frame 62 similar to the window frame 52 of the first type of target image 50 exists, however, it differs from the first type of target image 50 in that curtains 64 are attached to a window. Further, the current state 60 also differs from the first type of target image 50 in that there are a damage 66 and contamination 68 on a wall. As above, the user can compare the first type of target image 50 with the current state 60 to identify differences therebetween. Due to this, for example, confirmation work for restitution integrum upon the tenant moving out of the apartment can be performed by comparing the first type of target image 50 captured in the past with the current state 60. Due to this, the device contributes to convenience for the user, as well as to suppression of causes of troubles upon the confirmation.

In the example of FIG. 6, the first type of target image 50 is displayed over an entirety of the display unit 10 (that is, over the user's range of view). Since the display unit 10 has light permeability, the user can visually recognize the current state 60 existing behind the first type of target image 50 therethrough. As shown in FIG. 6, the user performs positioning such that the window frame 52 overlaps the window frame 62, and thereby can compare the first type of target image 50 captured in the past with the current state 60.

(Advantageous Effects of the Present Embodiment)

As above, in the present embodiment, in a case where the first type of target image and the first type of feature information are stored in association with each other in the memory 32 (S20 of FIG. 3) and thereafter the features (that is, the location and the posture of the terminal device 2) that match the features indicated by the first type of feature information (that is, the target location and the target posture) are detected (YES in S34 of FIG. 4), the terminal device 2 causes the display unit 10 to display the first type of target image stored in the memory 32 in association with the first type of feature information (S36, S38). As such, according to the terminal device 2 of the present embodiment, the captured first type of target image can suitably be displayed on the display unit 10 in a case where a predetermined condition is satisfied (that is, in the case where the features that match the features indicated by the first type of feature information are detected).

Further, in the present embodiment, the feature information includes the information indicating the target location and the information indicating the target posture. The terminal device 2 can cause the display unit 10 to display the first type of target image in a case where the target location indicated by the information included in the first type of feature information is detected by the GPS receiver 20 and the target posture indicated by the information included in the first type of feature information is detected by the sensor 22 (YES in S34) after the first type of target image and the first type of feature information have been stored in association with each other in the memory 32. The user can see the first type of target image displayed on the display unit 10 by arranging the terminal device 2 at the target location, which is the location that was detected at the timing when the first type of target image was captured, and retaining it in the posture that was detected at the timing. In other words, the user of the terminal device 2 can see the first type of target image by arranging and retaining the terminal device 2 at the same location and in the same posture as the location and the posture where the first type of target image was captured. The user of the terminal device 2 can suitably compare the situation at the time of image capture of the target image with the current situation.

Further, in the present embodiment, the terminal device 2 includes the frame 4 which is wearable on the head of the user, and the respective constituent elements are mounted on the frame 4. The cameras (that is, the first camera 12 and the second camera 14) are capable of capturing the range corresponding to the range of view of the user wearing the frame 4, and the display units 10a, 10b are respectively arranged at positions facing the right and left eyes of the user wearing the frame 4. Due to this, the terminal device 2 of the present embodiment can perform image capture of the target image in the range corresponding to the user's range of view and store the same in the memory 32, and can display the first type of target image on the display unit 10 corresponding to the user's range of view in the above case (YES in S34 of FIG. 4). The user can compare the situation at the time of image capture of the target image with the current situation, with its own range of view as a reference.

(Corresponding Relationships)

Corresponding relationships between the present embodiment and the claims will be described. The first camera 12 and the second camera 14 are examples of an "image capturing unit". The GPS receiver 20 is an example of a "location detecting unit". The memory 32 is an example of a "storage unit". The case of YES in S34 of FIG. 4 is an example of a "specific case".

Second Embodiment

Points differing from the first embodiment will primarily be described. The terminal device 2 according to the present embodiment includes a common basic configuration with the terminal device 2 according to the first embodiment (see FIGS. 1 and 2), however, it differs from the first embodiment in that it is not provided with the GPS receiver 20 and the sensor 22. Due to this, in the present embodiment, parts of the contents of the record process and the reproduction process also differ from those of the first embodiment (see FIGS. 7 and 8).

Figure 7:
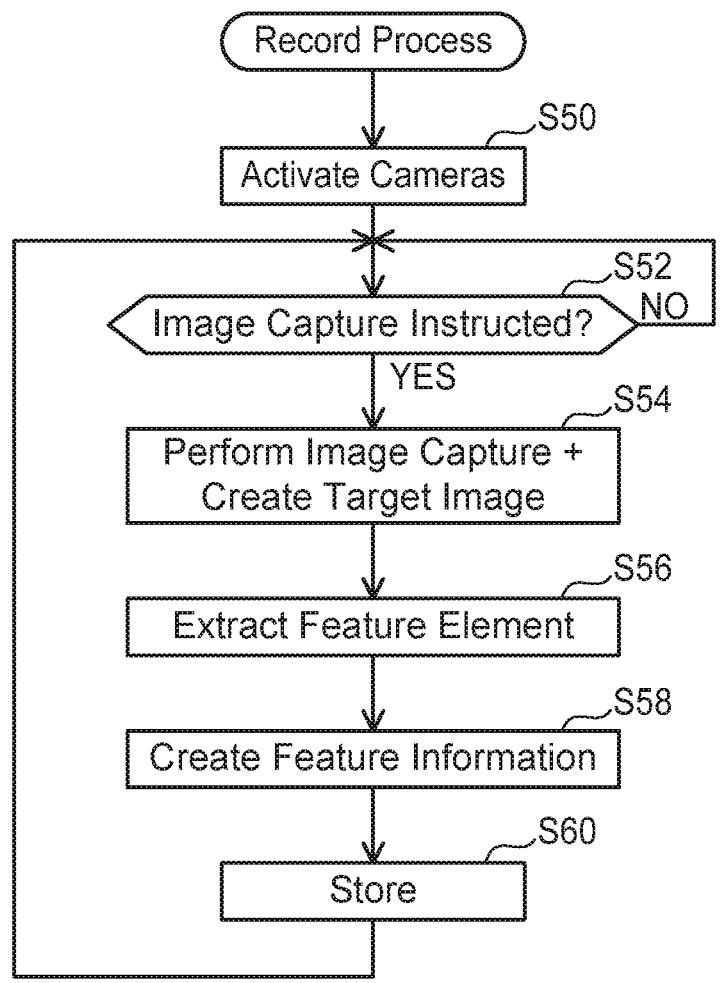
FIG. 7 shows a flowchart of a record process according to a second embodiment.

(Record Process; FIG. 7)

Processes of S50 to S54 are same as the processes of S10 to S14 of FIG. 3, so the detailed description thereof will be omitted. In S56, the controller 30 extracts a feature element in the target image created in S54. For example, as shown in an example of FIG. 9, in a case where an image of a vehicle 72 is included in the target image, a configuration of a front part 74 of the vehicle 72 (such as a shape or an arrangement of a head light, a front grill, or a number plate) is extracted as the feature element.

In subsequent S58, the controller 30 creates feature information that includes information indicating the feature element extracted in S56. Then, in S60, the controller 30 stores the target image created in S54 and the feature information created in S58 in association with each other in the image storage region 36 of the memory 32. When S60 is completed, the controller 30 returns to S52.

Figure 8:
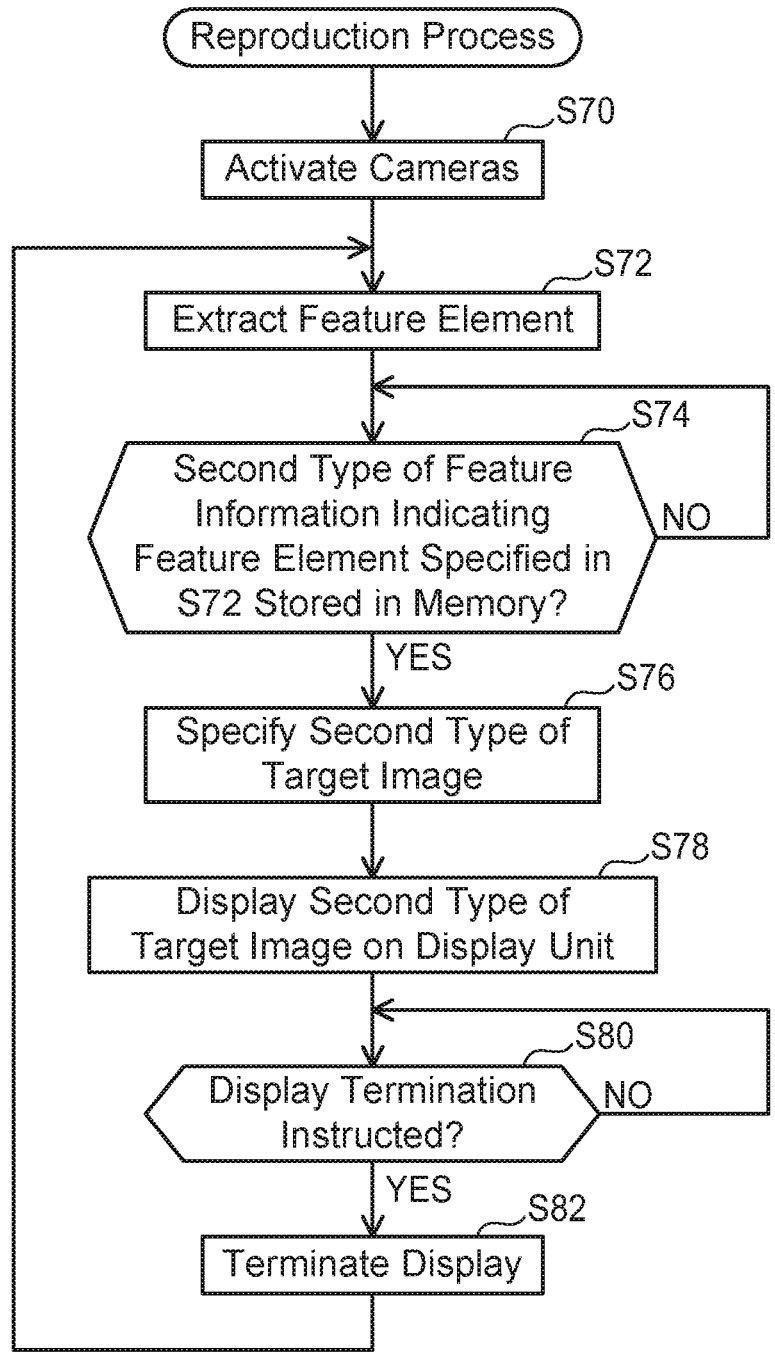
FIG. 8 shows a flowchart of a reproduction process according to the second embodiment.

(Reproduction Process; FIG. 8)

In S70, the controller 30 activates the cameras and causes the cameras to operate in an operation mode. Then, in subsequent S72, the controller 30 extracts a feature element in images that the cameras operating in the operation mode are capturing. That is, in S72, the controller 30 performs real-time extraction of the feature element in the images which the cameras are capturing.

In subsequent S74, the controller 30 determines whether or not feature information that includes information indicating a feature element matching the feature element extracted in S72 (which may hereinbelow be termed "second type of feature information" in the present embodiment) is stored in the image storage region 36 of the memory 32. In a case where the second type of feature information exists in the image storage region 36, the controller 30 determines YES in S74 and proceeds to S76.

In S76, the controller 30 specifies a target image associated with the second type of feature information (hereinbelow a "second type of target image") in the image storage region 36.

In S78, the controller 30 causes the display unit 10 to display the second type of target image specified in S76. Display examples of causing the display unit 10 to display the second type of target image in S78 will be described later in detail with reference to FIGS. 9 and 10. Processes of subsequent S80 and S82 are substantially same as the processes of S40 and S42 of FIG. 4, so the detailed description thereof will be omitted.

Figure 9:
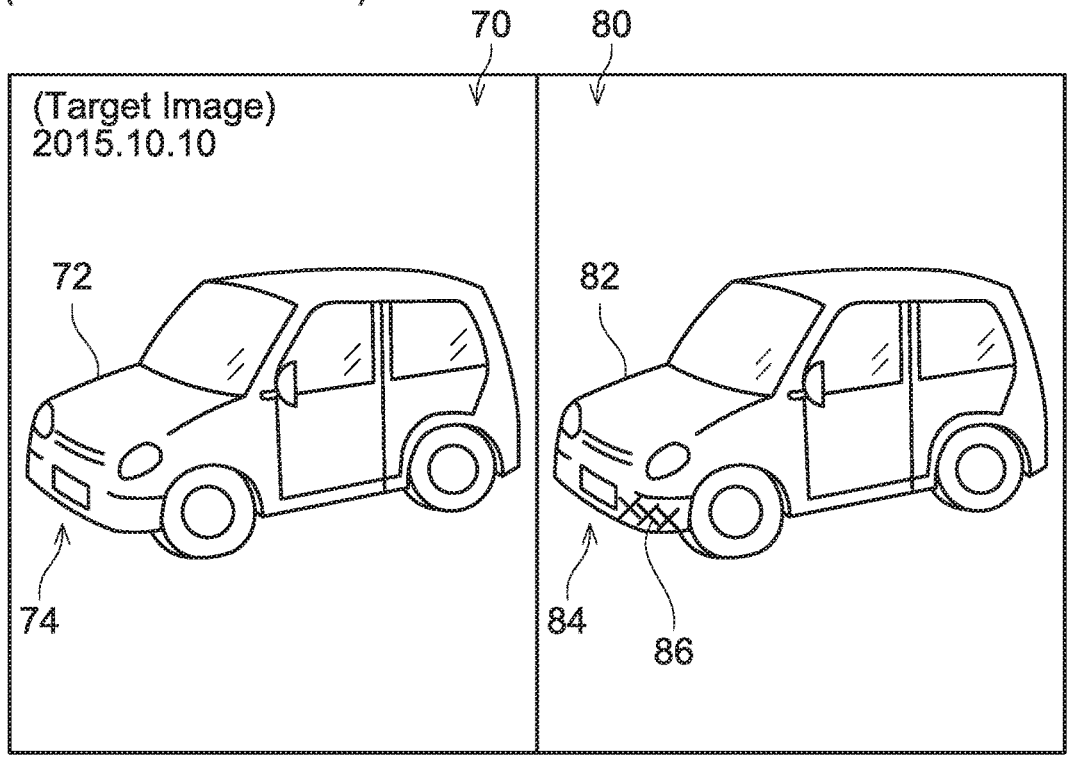
FIG. 9 shows a display example displaying a target image adjacent to a current state in the second embodiment.
Figure 10:
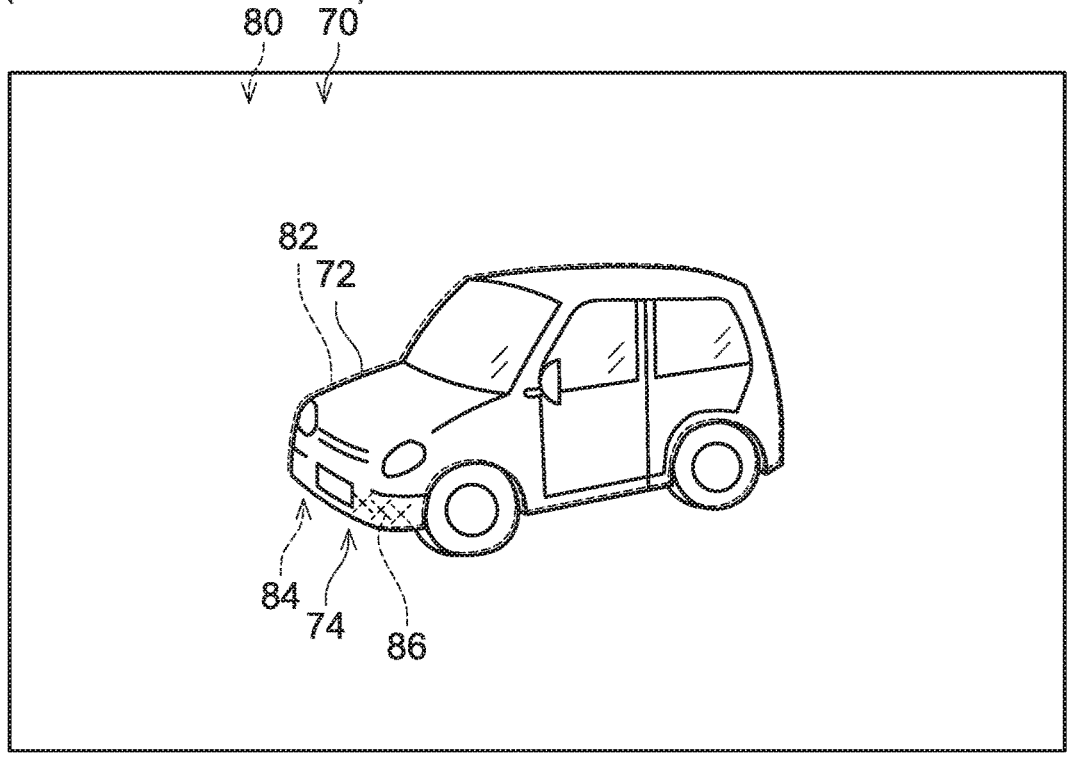
FIG. 10 shows a display example displaying the target image overlapped on the current state in the second embodiment.

(Display Examples of Second Type of Target Image; FIGS. 9 and 10)

The display examples for how the second type of target image is displayed on the display unit 10 in the present embodiment (see S78 of FIG. 8) will be described with reference to FIGS. 9 and 10. In the examples of FIGS. 9 and 10, a situation is assumed in which the user wishes to compare a second type of target image 70 that had captured a state of a rental car at a start of its rental period with a state 80 (which hereinbelow may be termed a "current state") of the rental car at present (for example, upon the rental car being returned). FIGS. 9 and 10 both show the display examples of the second type of target image 70 under the situation as above. When the display switching instruction is inputted, the controller 30 can switch between a display of FIG. 9 and a display of FIG. 10 to be displayed on the display unit 10.

In the example of FIG. 9, the second type of target image 70 is displayed on the left side in the display unit 10. According to the display of FIG. 9, the user can see and compare the second type of target image 70 displayed on the left side in the display unit 10 with the current state 80 which the user can directly see through the right side in the display unit 10. The second type of target image 70 includes an image of the vehicle 72 which is an object to be rented. At a time point of image capture of the second type of target image 70, the configuration of the front part 74 of the vehicle 72 is extracted as a feature element (see S56 of FIG. 7). Further, the second type of target image 70 also has an indication of being the target image and date and time of image capture of the target image displayed therewith. On the other hand, in the current state 80, a vehicle 82 similar to the vehicle 72 of the second type of target image 70 exists. A configuration of a front part 84 (that is, a feature element thereof) is same as that of the vehicle 72 in the second type of target image 70. However, the vehicle 82 in the current state 80 differs from the second type of target image 70 in that there is a scratch mark 86 on its bumper part. As such, the user can compare the second type of target image 70 with the current state 80 to identify differences therebetween. Due to this, for example, confirmation work for a damage check upon the rental car being returned can be performed by comparing the second type of target image 70 captured in the past with the current state 80. Due to this, the device contributes to convenience for the user, as well as to suppression of causes of troubles upon the check.

In the example of FIG. 10, the second type of target image 70 is displayed over the entirety of the display unit 10 (that is, over the user's range of view). Since the display unit 10 has the light permeability, the user can visually recognize the current state 80 existing behind the second type of target image 70 therethrough. As shown in FIG. 10, the user performs positioning such that the vehicle 72 overlaps the vehicle 82, and thereby can compare the second type of target image 70 captured in the past with the current situation 80.

(Advantageous Effects of the Present Embodiment)

As above, in the present embodiment, the feature information includes the information indicating the feature element in the target image. The terminal device 2 can cause the display unit 10 to display the second type of target image in the case where the feature element is captured again by the cameras (YES in S74 of FIG. 8) after the second type of target image and the second type of feature information have been stored in association with each other in the memory 32. The user can see the second type of target image displayed on the display unit 10 by causing the cameras to capture again the feature element that was extracted at the timing when the second type of target image was captured. Due to this, the user of the terminal device 2 can suitably compare the situation at the time of image capture of the second type of target image with the current situation. In the present embodiment, the case of YES in S74 of FIG. 8 is an example of the "specific case".

Especially in the present embodiment, unlike the first embodiment, the feature information does not include information indicating a location nor information indicating a posture. Therefore, even in a case where past and current situations of a movable property such as a vehicle need to be compared, advantage that the past situation can be compared with the current situation regardless of a location at which the movable property exists can be obtained.

Third Embodiment

A third embodiment is a variant of the second embodiment. Points of the third embodiment differing from the second embodiment will primarily be described. The terminal device 2 according to the present embodiment includes a common basic configuration with the terminal device 2 according to the second embodiment. The present embodiment differs from the second embodiment in that the controller 30 does not execute the record process (see FIG. 7). In the present embodiment, as a substitute to the execution of the record process in advance, the controller 30 executes a process to acquire a combination of a target mage and feature information from another device (such as a terminal device provided with an image capturing unit) via the communication I/F 24 in advance and a process to store the combination of the acquired target image and feature information in the image storage region 36 of the memory 32. That is, the combination of the target image and the feature information stored in the image storage region 36 in this embodiment has been created by the other device in advance. The target image of the present embodiment is an image captured by the other device. Based on this, the controller 30 executes the reproduction process (see FIG. 8) in the present embodiment as well, similar to the second embodiment.

Figure 11:
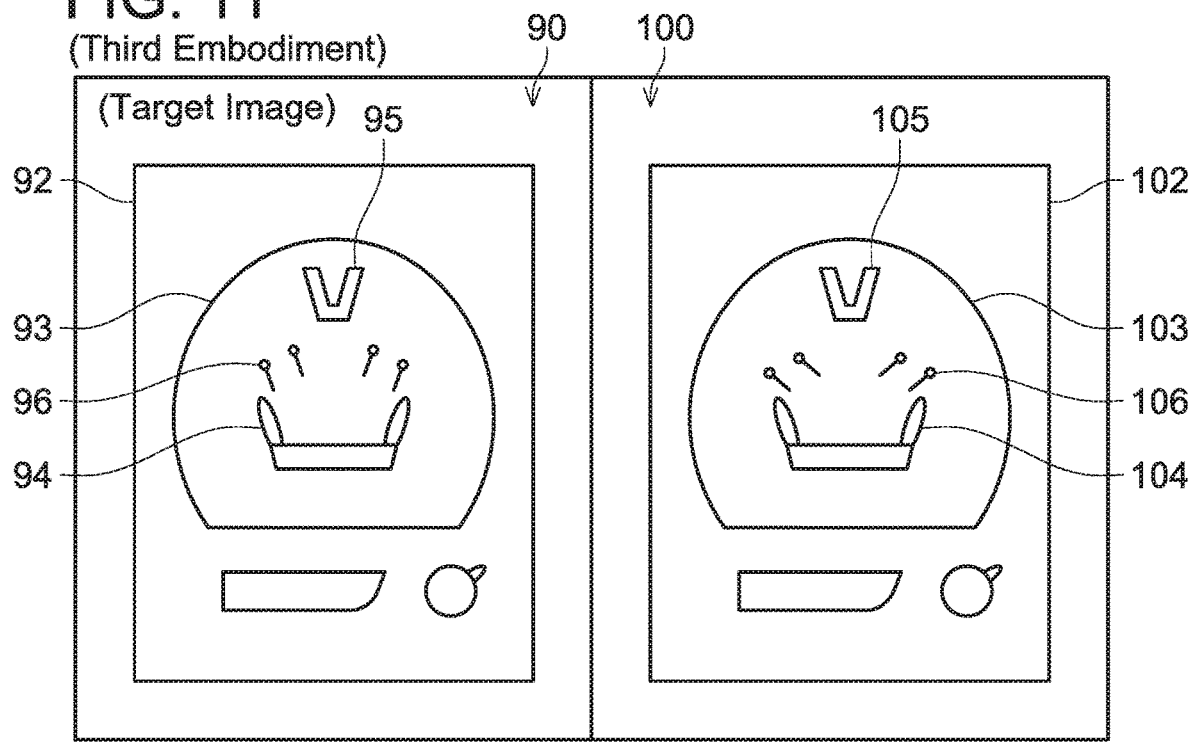
FIG. 11 shows a display example displaying a target image adjacent to a current state in a third embodiment.
Figure 12:
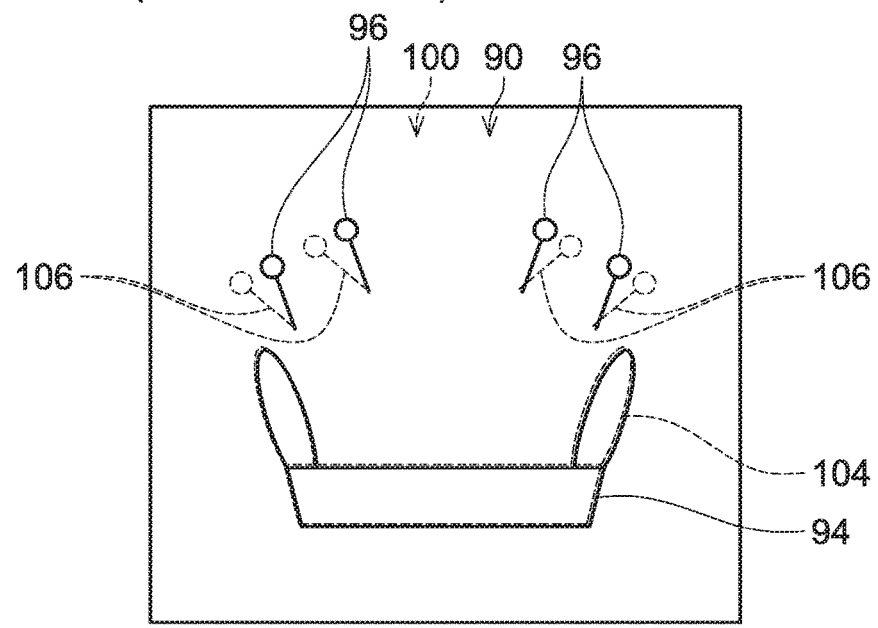
FIG. 12 shows a display example displaying the target image overlapped on the current state in the third embodiment.

(Display Examples of Second Type of Target Image; FIGS. 11 and 12)

The display examples for how the second type of target image is displayed on the display unit 10 in the present embodiment (see S78 of FIG. 8) will be described with reference to FIGS. 11 and 12. In the examples of FIGS. 11 and 12, a situation is assumed in which the user wishes to compare a second type of target image 90 that had captured a state of a game machine (specifically, a pachinko machine) at a time when it passed an inspection by an inspection organization (or at a time when it was shipped from a game machine manufacturer) with a state 100 (which hereinbelow may be termed a "current situation") of a game machine of a same type at present (for example, at a time point after it has started its operation in a game store). More specifically, a situation is assumed in which the user wishes to compare orientations of pins in the game machine at the time when it passed the game machine inspection with current orientations of pins to check whether or not the orientations of the pins have excessively modified. FIGS. 11 and 12 both show the display examples of the second type of target image 90 under the situation as above. FIG. 12 shows a display example in which a vicinity of a prize-winning inlet 94 (104) of the game machine is enlarged for easier understanding. In this embodiment as well, when the display switching instruction is inputted, the controller 30 can switch between a display of FIG. 11 and a display of FIG. 12 to be displayed on the display unit 10.

In the example of FIG. 11, the second type of target image 90 is displayed on the left side in the display unit 10. According to the display of FIG. 11, the user can see and compare the second type of target image 90 displayed on the left side in the display unit 10 with the current state 100 which the user can directly see through the right side in the display unit 10. The second type of target image 90 includes an image of a game machine 92 that was captured at a time when it passed an inspection of the game machine 92. The game machine 92 primarily includes a game area (board surface) 93 where game media (specifically, pachinko balls) are inputted, the prize-winning inlet 94 where the pachinko balls inputted onto the board surface 93 enter, a decoration 95 arranged on the board surface 93, and pins 96 for changing trajectories of the inputted pachinko balls. At the time of image capture of the second type of target image 90, these configurations 93, 94, 95, 96 are extracted as feature elements (see S56 of FIG. 7). Further, the game machine of the same type as that of the game machine 92 has the same feature elements.

On the other hand, the current state 100 on the right side includes a game machine 102 of the same type as that of the game machine 92 in the second type of target image 90. Due to this, the game machine 102 also includes a board surface 103, a prize-winning inlet 104, a decoration 105, and pins 106 that are in common with the game machine 92 in the second type of target image 90. However, orientations of the pins 106 in the game machine 102 in the current state 100 (that is, positions of heads of the pins 106) differ from orientations of the pins 96 in the game machine 92 in the second type of target image 90. As above, the user can compare the second type of target image 90 with the current state 100 to identify differences therebetween. Due to this, the user can compare the orientations of the pins 96 in the game machine 92 at the time when it passed the inspection with the current orientations of the pins 106 in the game machine 102 to check whether or not the orientations of the pins 106 have been modified excessively.

In the example FIG. 12, the second type of target image 90 is displayed over the entirety of the display unit 10 (that is, over the user's range of view). Since the display unit 10 has the light permeability, the user can visually recognize the current state 100 existing behind the second type of target image 90 therethrough. As shown in FIG. 12, the user performs positioning such that the prize-winning inlet 94 overlaps the prize-winning inlet 104, and thereby can easily compare the orientations of the pins 96 in the game machine 92 at the time when it passed the inspection with the current orientations of the pins 106 in the game machine 102.

(Advantageous Effects of the Present Embodiment)

As above, in the terminal device 2 according to the present embodiment, the controller acquires the combination of the target image and the feature information from the other device (such as a terminal device provided with an image capturing unit) in advance as the substitute to the execution of the record process (see FIG. 7), and stores the acquired combination of the target image and the feature information in the image storage region 36 of the memory 32. Then, the reproduction process (see FIG. 8) is executed. Due to this, in the present embodiment as well, similarly to the second embodiment, the user can see the second type of target image displayed on the display unit 10 by causing the cameras to capture again second type of feature elements extracted at the timing when the second type of target image was captured. Due to this, the user of the terminal device 2 can suitably compare the situation at the time of image capture of the second type of target image with the current situation. In the present embodiment, the other device provided with the image capturing unit is an example of an "image capturing unit".

Fourth Embodiment

The fourth embodiment is a variant of the third embodiment. Points differing from the third embodiment will primarily be described for the fourth embodiment. In this embodiment as well, the controller 30 performs the process to acquire a combination of a target image and feature information from another device in advance via the communication IF 24 as the substitute to the execution of the record process in advance and the process to store the acquired combination of the target image and the feature information in the image storage region 36 of the memory 32. However, the present embodiment differs from the third embodiment in that the target image acquired from the other device in advance is not an image captured in advance by a camera or the like of the other device (that is, a captured image), but is a virtual image created in the other device in advance.

Figure 13:
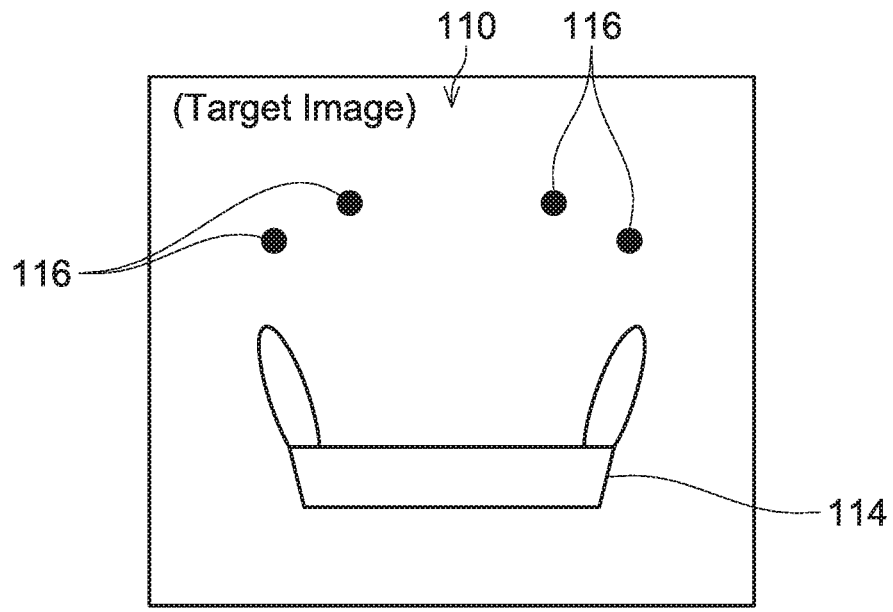
FIG. 13 shows an example of a target image used in a fourth embodiment.

An example of a target image 110 used in the present embodiment will be described with reference to FIG. 13. This target image 110 includes a virtual image that indicates a prize-winning inlet 114 and pinheads 116 provided on a game machine (see FIGS. 11 and 12). The virtual image of the pin heads 116 is colored with an outstanding color. When the target image 110 is created in the other device, a shape and an arrangement of the prize-winning inlet 114 and positions of the pin heads 116 are respectively extracted as feature elements. The feature information includes information indicating these feature elements. Further, in the present embodiment as well, the controller 30 executes the reproduction process (see FIG. 8) similarly to the third embodiment.

Figure 14:
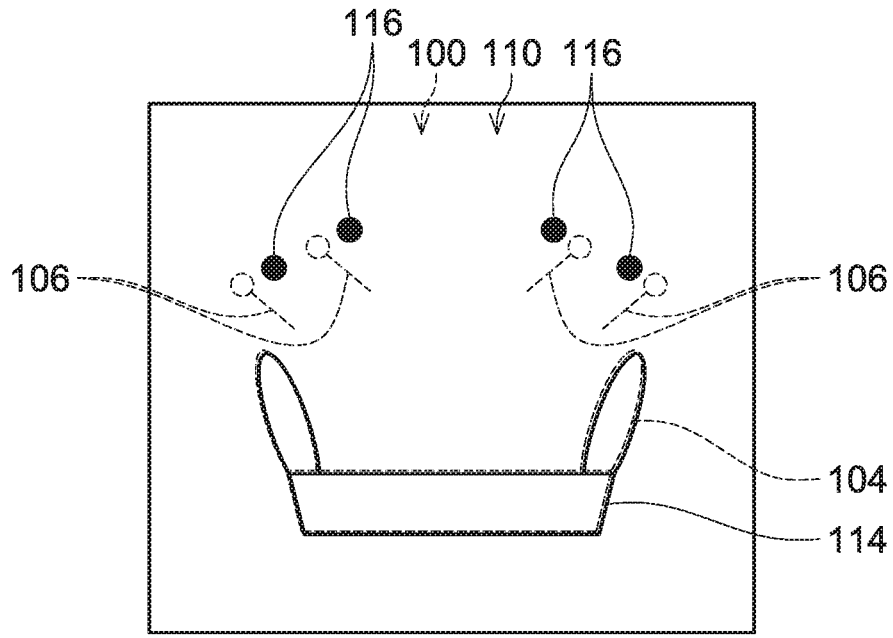
FIG. 14 shows a display example displaying the target image overlapped on a current state in the fourth embodiment.

(Display Example of Second Type of Target Image; FIG. 14)

A display example for how the second type of target image (that is, the target image 110 of FIG. 13) is displayed on the display unit 10 in the present embodiment (see S78 of FIG. 8) will be described with reference to FIG. 14. In the example of FIG. 14, the second type of target image 110 is displayed over the entirety of the display unit 10, similarly to the example of FIG. 12. Since the display unit 10 has the light permeability, the user can visually recognize the current state 100 existing behind the second type of target image 110 therethrough. As shown in FIG. 14, the user performs positioning such that the prize-winning inlet 114 of the virtual image overlaps the prize-winning inlet 104 in reality, and thereby can more easily compare the positions of heads of the pins 116 in the virtual image with the current positions of the heads of the pins 106 in the game machine 102.

(Advantageous Effects of the Present Embodiment)

In the present embodiment as well, the user can see the second type of target image displayed on the display unit 10 by causing the cameras to capture the second type of feature element stored in association with the second type of target image in the memory 32. Due to this, the user of the terminal device 2 can suitably compare the second type of target image with the current situation.

The embodiments have been described in detail above, however, these are mere exemplary indications and thus do not limit the scope of the claims. The technique described in the claims includes modifications and variations of the specific examples presented above. For example, variants as below may be employed.

(Variant 1) In the respective embodiments above, the terminal device 2 is configured as a single device in which all the constituent elements 10 to 32 are mounted on the frame 4. No limitation is placed hereto, and a part of the constituent elements of the terminal device 2 may be provided other than on the frame 4. For example, the cameras may be provided other than on the frame 4 in a manner capable of communicating with the controller 30. In this case, the controller 30 simply needs to be able to acquire images captured by the cameras. For example, the cameras may be provided in another device (such as a driving recorder). Further, for example, the memory 32 may be provided other than on the frame 4 in a manner capable of communicating with the controller 30. In this variant, the terminal device 2 simply needs to be configured by combining the constituent elements mounted on the frame 4 and the constituent elements provided other than on the frame 4.

(Variant 2) In the respective embodiments above, the terminal device 2 includes the operating unit 18 provided on the outer surface of the control box 16. No limitation is placed hereto, and the terminal device 2 may not be provided with the operating unit 18 physically. In this case, various instructions such as the record process starting instruction, the image capturing instruction, and the reproduction process starting instruction may be inputted by the controller 30 detecting a gesture of the user made in an image capturing range of the cameras (that is, in the aforementioned specific range).

(Variant 3) In the respective embodiments above, the terminal device 2 is provided with two cameras, namely the first camera 12 and the second camera 14. No limitation is placed hereto, and the terminal device 2 may include only one camera.

(Variant 4) In the first embodiment as above, the terminal device 2 is provided with the GPS receiver 20 and the sensor 22. Further, the feature information includes the information indicating the target location and the information indicating the target posture. No limitation is placed hereto, and the terminal device 2 may not include the sensor 22. In this case, the feature information may not include the information indicating the target posture so long as it includes the information indicating the target location.

(Variant 5) In the first embodiment as above, the controller 30 specifies the location of the terminal device 2 by using the location outputted by the GPS receiver 20, however, a configuration for specifying the location of the terminal device 2 is not limited hereto. For example, the controller 30 may detect presence of an access point for a Wi-Fi communication via the communication I/F 24, calculate a distance between the terminal device 2 and a location of the access point (which is known information), and specify the location of the terminal device 2. That is, a "location detecting unit" is not limited to a GPS receiver, and may include other configuration capable of detecting the location of the terminal device 2.

(Variant 6) In the third and fourth embodiments as above, the terminal device 2 may be provided with the GPS receiver 20 and the sensor 22. Further, the feature information may include information indicating a predetermined target location and information indicating a predetermined target posture. The controller 30 may execute the reproduction process of FIG. 4 (that is, the reproduction process based on the location and the posture of the terminal device 2) as a substitute to the reproduction process of FIG. 8.

(Variant 7) In the respective embodiments above, as shown in FIG. 1, the terminal device 2 has a shape that is wearable on the head of the user. However, the terminal device 2 is not limited to the shape that is wearable on the head of the user, and other arbitrary shape (for example, a shape which the user can grip onto) may be employed.

(Variant 8) In each of the embodiments above, the target image captured by the cameras is a still image. However, no limitation is placed thereto, and the target image may be a video.

(Variant 9) In the respective embodiments above, the display unit 10 of the terminal device 2 is a light permeable display member. No limitation is placed hereto, and the display unit of the terminal device 2 may be a light shielding display.

Further, the technical features described in the description and the drawings may technically be useful alone or in various combinations, and are not limited to the combinations as originally claimed. Further, the technique described in the description and the drawings may concurrently achieve a plurality of aims, and technical significance thereof resides in achieving any one of such aims.

The invention claimed is:

1. A terminal device comprising:
an image capturing unit;
a display unit;
a controller;
a storage unit; and
a location detecting unit configured to detect a location of the terminal device in a predetermined area,
wherein the controller comprises:
an image capture controlling unit configured to cause the image capturing unit to perform image capture;
a creating unit configured to create feature information indicating a feature of an environment of the terminal device at a target timing when the image capturing unit performs image capture of a target image, wherein the creating unit is configured to specify a feature element included in the target image captured by the image capturing unit at the target timing and create the feature information indicating the feature including the feature element that was specified;
a storage controlling unit configured to store the target image that was captured and the feature information that was created in the storage unit in association with each other; and
a display controlling unit configured to cause the display unit to display the target image stored in the storage unit in association with the feature information indicating the feature including the feature element such that the target image is to be compared with a current state in the displaying unit, in a specific case where image capture of the feature element by the image capturing unit is detected after the target image and the feature information have been stored in the storage unit, wherein
the creating unit is configured to create the feature information indicating the feature including a target location detected by the location detecting unit at the target timing, and
the display controlling unit is configured to cause the display unit to display the target image stored in the storage unit in association with the feature information indicating the feature including the target location, in the specific case where the target location is detected by the location detecting unit after the target image and the feature information have been stored in the storage unit.

2. The terminal device as in claim 1, further comprising:
a sensor configured to detect a posture of the terminal device,
wherein
the creating unit is configured to create the feature information indicating the feature further including a target posture detected by the sensor at the target timing, and
the display controlling unit is configured to cause the display unit to display the target image stored in the storage unit in association with the feature information indicating the feature including the target location and the target posture, in the specific case where the target location is detected by the location detecting unit and the target posture is detected by the sensor after the target image and the feature information have been stored in the storage unit.

3. The terminal device as in claim 1, further comprising:
a frame being wearable on a head of a user,
wherein
the image capturing unit is mounted on the frame and capable of capturing a range corresponding to a range of view of the user, and
the display unit is mounted on the frame and arranged at a position facing at least one of a right eye and a left eye of the user wearing the frame.

4. The terminal device as in claim 1, wherein,
the display controlling unit is configured to cause the display unit to display the target image such that the target image and the current state overlap on the display unit.

5. The terminal device as in claim 1, wherein,
the display unit have light permeability, and
the display controlling unit is configured to cause the display unit to display the target image such that a user visually recognizes the current state existing behind the display unit through the display unit.

6. A terminal device comprising:
a display unit;
a controller;
a storage unit; and
a location detecting unit configured to detect a location of the terminal device in a predetermined area,
wherein the controller comprises:
an acquiring unit configured to acquire a target image captured by an image capturing unit and feature information indicating a feature of an environment of the terminal device at a target timing when the image capturing unit performs image capture of the target image, the feature information indicates the feature including a feature element included in the target image captured by the image capturing unit at the target timing;
a storage controlling unit configured to store the target image and the feature information that were acquired in the storage unit in association with each other; and
a display controlling unit configured to cause the display unit to display the target image stored in the storage unit in association with the feature information indicating the feature including the feature element such that the target image is to be compared with a current state in the displaying unit, in a specific case where image capture of the feature element by the image capturing unit is detected after the target image and the feature information have been stored in the storage unit, wherein
the acquiring unit is configured to acquire the feature information indicating the feature including a target location detected by the location detecting unit at the target timing, and
the display controlling unit is configured to cause the display unit to display the target image stored in the storage unit in association with the feature information indicating the feature including the target location, in the specific case where the target location is detected by the location detecting unit after the target image and the feature information have been stored in the storage unit.

7. A non-transitory computer-readable recording medium storing computer readable instructions for a terminal device, wherein
the terminal device comprises:
a display unit;
a controller; and
a storage unit; and
a location detecting unit configured to detect a location of the terminal device in a predetermined area,
the computer-readable instructions, when executed by the controller, cause the terminal device to:
acquire a target image captured by an image capturing unit and feature information indicating a feature of an environment of the terminal device at a target timing when the image capturing unit performs image capture of the target image, the feature information indicates the feature including a feature element included in the target image captured by the image capturing unit at the target timing, wherein the feature information indicates the feature including a target location detected by the location detecting unit at the target timing;
store the target image and the feature information that were acquired in the storage unit in association with each other; and
cause the display unit to display the target image stored in the storage unit in association with the feature information indicating the feature including the feature element such that the target image is to be compared with a current state in the displaying unit, in a specific case where image capture of the feature element by the image capturing unit is detected after the target image and the feature information have been stored in the storage unit, wherein
the target image stored in the storage unit in association with the feature information indicating the feature including the target location is displayed in the specific case where the target location is detected by the location detecting unit after the target image and the feature information have been stored in the storage unit.

8. A method executed by a terminal device, wherein
the terminal device comprises:
a display unit;
a controller;
a storage unit, and
a location detecting unit configured to detect a location of the terminal device in a predetermined area,
the method comprising:
acquiring a target image captured by an image capturing unit and feature information indicating a feature of an environment of the terminal device at a target timing when the image capturing unit performs image capture of the target image, the feature information indicates the feature including a feature element included in the target image captured by the image capturing unit at the target timing, wherein the feature information indicates the feature including a target location detected by the location detecting unit at the target timing;
storing the target image and the feature information that were acquired in the storage unit in association with each other; and
causing the display unit to display the target image stored in the storage unit in association with the feature information indicating the feature including the feature element such that the target image is to be compared with a current state in the displaying unit, in a specific case where image capture of the feature element by the image capturing unit is detected after the target image and the feature information have been stored in the storage unit, wherein
the target image stored in the storage unit in association with the feature information indicating the feature including the target location is displayed in the specific case where the target location is detected by the location detecting unit after the target image and the feature information have been stored in the storage unit.

9. A terminal device comprising:
an image capturing unit;
a display unit;
a controller; and
a storage unit,
wherein the controller comprises:
   an image capture controlling unit configured to cause the image capturing unit to perform image capture;
   a creating unit configured to create feature information indicating a feature of an environment of the terminal device at a target timing when the image capturing unit performs image capture of a target image, wherein the creating unit is configured to specify a feature element included in the target image captured by the image capturing unit at the target timing and create the feature information indicating the feature including the feature element that was specified;
   a storage controlling unit configured to store the target image that was captured and the feature information that was created in the storage unit in association with each other; and
   a display controlling unit configured to cause the display unit to display the target image stored in the storage unit in association with the feature information indicating the feature including the feature element such that the target image is to be compared with a current state in the displaying unit, in a specific case where image capture of the feature element by the image capturing unit is detected after the target image and the feature information have been stored in the storage unit, wherein
   the display unit have light permeability, and
   the display controlling unit is configured to cause the display unit to display the target image such that a user visually recognizes the current state existing behind the display unit through the display unit.

10. A terminal device comprising:
a display unit;
a controller; and
a storage unit,
wherein the controller comprises:
   an acquiring unit configured to acquire a target image captured by an image capturing unit and feature information indicating a feature of an environment of the terminal device at a target timing when the image capturing unit performs image capture of the target image, the feature information indicates the feature including a feature element included in the target image captured by the image capturing unit at the target timing;
   a storage controlling unit configured to store the target image and the feature information that were acquired in the storage unit in association with each other; and
   a display controlling unit configured to cause the display unit to display the target image stored in the storage unit in association with the feature information indicating the feature including the feature element such that the target image is to be compared with a current state in the displaying unit, in a specific case where image capture of the feature element by the image capturing unit is detected after the target image and the feature information have been stored in the storage unit, wherein
   the display unit have light permeability, and
   the display controlling unit is configured to cause the display unit to display the target image such that a user visually recognizes the current state existing behind the display unit through the display unit.

11. A non-transitory computer-readable recording medium storing computer readable instructions for a terminal device, wherein
the terminal device comprises:
   a display unit;
   a controller; and
   a storage unit,
the computer-readable instructions, when executed by the controller, cause the terminal device to:
   acquire a target image captured by an image capturing unit and feature information indicating a feature of an environment of the terminal device at a target timing when the image capturing unit performs image capture of the target image, the feature information indicates the feature including a feature element included in the target image captured by the image capturing unit at the target timing;
   store the target image and the feature information that were acquired in the storage unit in association with each other; and
   cause the display unit to display the target image stored in the storage unit in association with the feature information indicating the feature including the feature element such that the target image is to be compared with a current state in the displaying unit, in a specific case where image capture of the feature element by the image capturing unit is detected after the target image and the feature information have been stored in the storage unit, wherein
   the display unit have light permeability, and
   the display controlling unit is configured to cause the display unit to display the target image such that a user visually recognizes the current state existing behind the display unit through the display unit.

12. A method executed by a terminal device, wherein
the terminal device comprises:
   a display unit;
   a controller; and
   a storage unit,
the method comprising:
   acquiring a target image captured by an image capturing unit and feature information indicating a feature of an environment of the terminal device at a target timing when the image capturing unit performs image capture of the target image, the feature information indicates the feature including a feature element included in the target image captured by the image capturing unit at the target timing;
   storing the target image and the feature information that were acquired in the storage unit in association with each other; and
   causing the display unit to display the target image stored in the storage unit in association with the feature information indicating the feature including the feature element such that the target image is to be compared with a current state in the displaying unit, in a specific case where image capture of the feature element by the image capturing unit is detected after the target image and the feature information have been stored in the storage unit, wherein
the display unit have light permeability, and
the display controlling unit is configured to cause the display unit to display the target image such that a user visually recognizes the current state existing behind the display unit through the display unit.

* * * * *